United States Patent [19]

Pickering et al.

[11] 4,442,053
[45] Apr. 10, 1984

[54] METHOD OF AND APPARATUS FOR REPAIRING A LEAK IN A PIPE OR PIPELINE

[75] Inventors: John Pickering, Belper; Ian Woodhouse; Araspillai N. Ganendran, both of Burton-on-Trent, all of England

[73] Assignee: BTR Limited, London, England

[21] Appl. No.: 400,267

[22] Filed: Jul. 21, 1982

[30] Foreign Application Priority Data

Aug. 11, 1981 [GB] United Kingdom ............... 8124560

[51] Int. Cl.$^3$ .............................................. B29C 1/02
[52] U.S. Cl. ....................................... 264/36; 249/90; 249/95; 264/465; 264/219; 264/262
[58] Field of Search ................. 264/36, 219, 222, 262, 264/274, 46.5, 46.6, 46.9; 249/90, 95, 96, 97; 425/111

[56] References Cited

U.S. PATENT DOCUMENTS 3,563,234 2/1971 Umstead .............................. 264/222
3,782,390 1/1974 Johnson ............................. 264/46.6
4,323,526 4/1982 Hilbush ................................. 264/36

*Primary Examiner*—Jay H. Woo
*Assistant Examiner*—Mary A. Becker
*Attorney, Agent, or Firm*—Watson, Cole, Grindle & Watson

[57] ABSTRACT

A flexible wrapping is adapted to fit around a section of pipe or pipeline requiring repair. The wrapping has inner and outer skins and a plurality of tags for limiting the separation between the skins. The wrapping is sealed in position around the pipe or pipeline by means of straps. A mould forming material is introduced through a filler into the space between the skins and then allowed to solidify. A sealant is then introduced under pressure through an injector into the mound space between the inner skin and the pipe or pipeline. A pressure gauge indicates the pressure in the mould space. Gases may escape from the mould space through a vent. The invention provides a method of and apparatus for repairing a leak in a pipe or pipeline.

12 Claims, 4 Drawing Figures

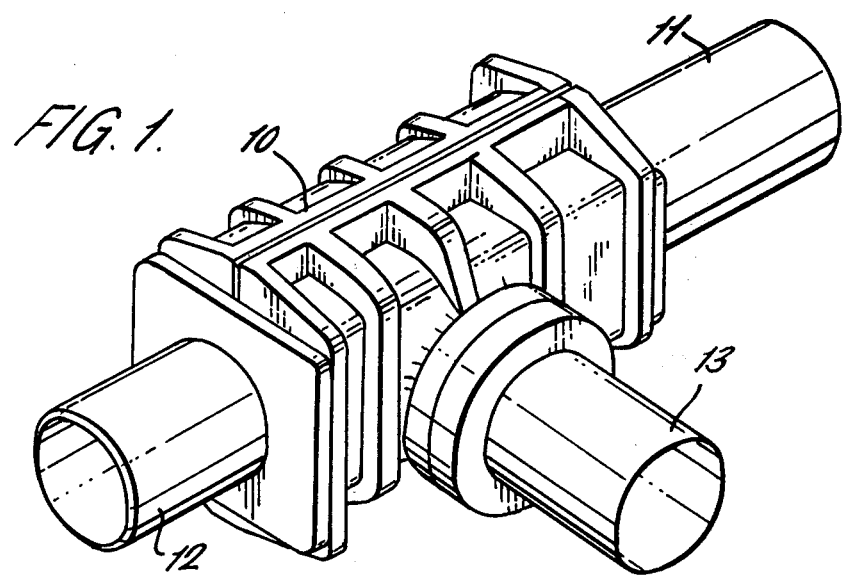
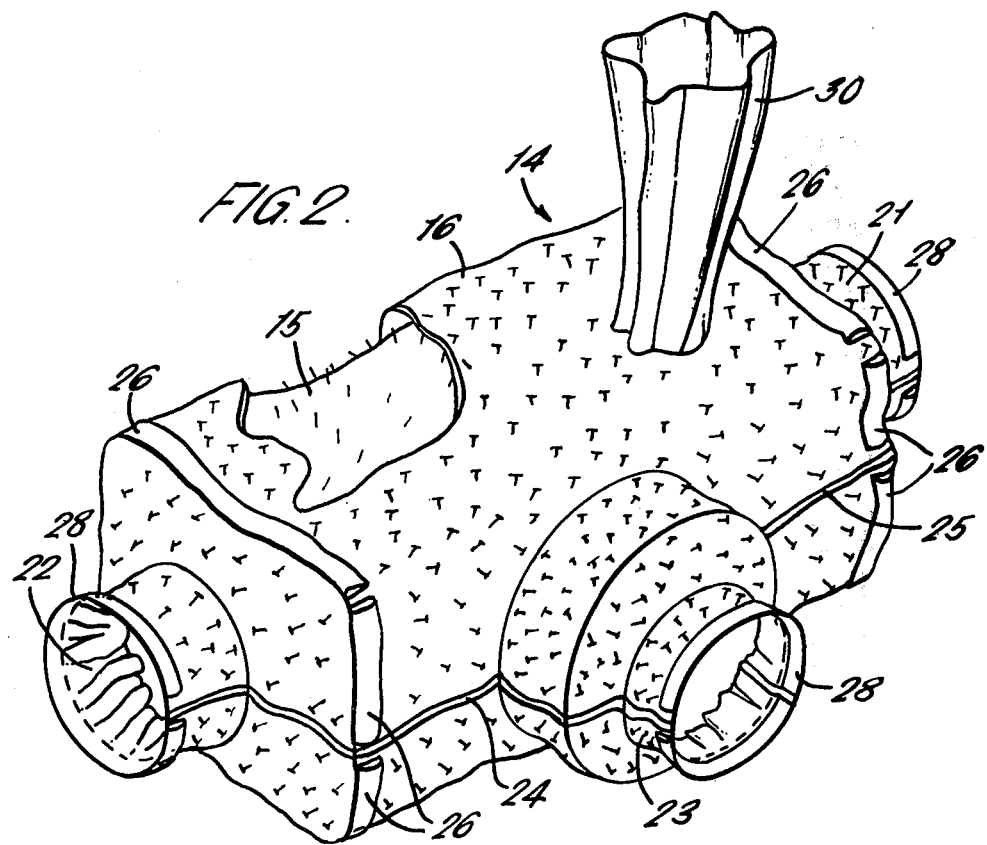

METHOD OF AND APPARATUS FOR REPAIRING A LEAK IN A PIPE OR PIPELINE

The invention relates to a method of and apparatus for repairing a leak in a pipe or pipeline. More particularly, but not exclusively, the invention relates to the repair of leaks in gas pipes or pipelines.

BACKGROUND TO THE INVENTION

Hitherto, a repair of a leak in a pipe or pipeline carrying fluid at low pressures, typically up to 2 PSI (140 mbar), or what is termed the semi-medium pressure range up to 10 PSI (700 mbar) have been repaired by using a flexible muff wrapped and secured around the pipe or pipeline, sealant material being introduced into the space between the muff and the pipe or pipeline. For pressures higher than the semi-medium pressure range, a rigid mould has been required since the flexible muff arrangement is not capable of withstanding the higher pressures. Use of a rigid mould involves the expense of the mould itself and, since the mould is designed to be reusable, it is often difficult to judge when the sealant has set so that the mould can be released. Release of the mould too early would mean that the repair could be unsatisfactory.

BRIEF SUMMARY OF THE INVENTION

According to the invention, there is provided a method of repairing a leak in a pipe or pipeline comprising the steps of wrapping around the pipe or pipeline a flexible wrapping having an inner and an outer skin and means for limiting separation between the skins, sealing the skins when wrapped around the pipe or pipeline, introducing mould-forming material into the space between the skins, allowing the mould-forming material to solidify to form a rigid mould, and introducing sealant into the mould space between the inner skin and the pipe or pipeline, there being vent means from the mould space to the atmosphere.

The vent means are preferably open during filling of the mould space with sealant material and closed when the mould space is full of sealant material. The sealant is preferably pressurized in the mould space. The vent means are preferably opened periodically during the pressurization of the sealant material. When a desired sealant pressure is reached in the mould space, the vent means are preferably opened until only sealant material escapes from the vent means.

Support means are preferably fitted to the flexible wrapping for supporting the flexible wrapping while the mould-forming material is introduced.

The inner skin may have a sliding clasp fastener, and the sliding clasp fastener is preferably closed and then sealed by sealant material to enclose the pipe or pipeline. The outer skin preferably also has a sliding clasp fastener and the sliding clasp fastener is preferably closed and sealed by sealant material to enclose the inner skin.

The ends of the skins are preferably secured to the pipe or pipeline by tightening straps around the skins to secure the skins between the straps and the pipe or pipeline.

The space between the skins is preferably filled through more than one filler, the fillers being arranged at different heights and the lowest filler being used first and closed before the next filler is used, the sequence being followed until the highest filler has been closed. Each filler may comprise a filler tube leading to the space between the skins, each filler tube being closed by rolling down the filler tube when the space between the skins has been filled with filler above the level of the opening of the filler tube into the space between the skins.

According to a further aspect of the invention, there is provided apparatus for performing a method according to the invention comprising a flexible wrapping having an inner and an outer skin, means for limiting separation of the skins, and vent means, means for sealing the wrapping around a pipe or pipeline, mould-forming material for introduction into the space between the two skins and sealant material for introduction into the mould space between the inner skin and the pipe or pipeline.

The means for limiting separation of the skins may comprise a multiplicity of tag members passing through the skins. Each tag member may have an elongate body portion passing through the skins and retaining end portions, one lying on the side of the first skin remote from the second skin and the other lying on the side of the second skin remote from the first skin.

A pressure gauge may be provided for indicating the pressure of sealant in the mould space.

By way of example, one embodiment of a method of and apparatus for repairing a leak in a pipe or pipeline according to the invention will now be described with reference to the accompanying drawings.

BRIEF DESCRIPTION OF THE DRAWINGS

FIG. 1 is a perspective view of a Tee-joint in a pipeline, being a typical joint which could require repair;

FIG. 2 is a perspective view of a flexible wrapping for fitting and being sealed around the joint of FIG. 1;

DETAILED DESCRIPTION OF THE EMBODIMENT

Figure 3:
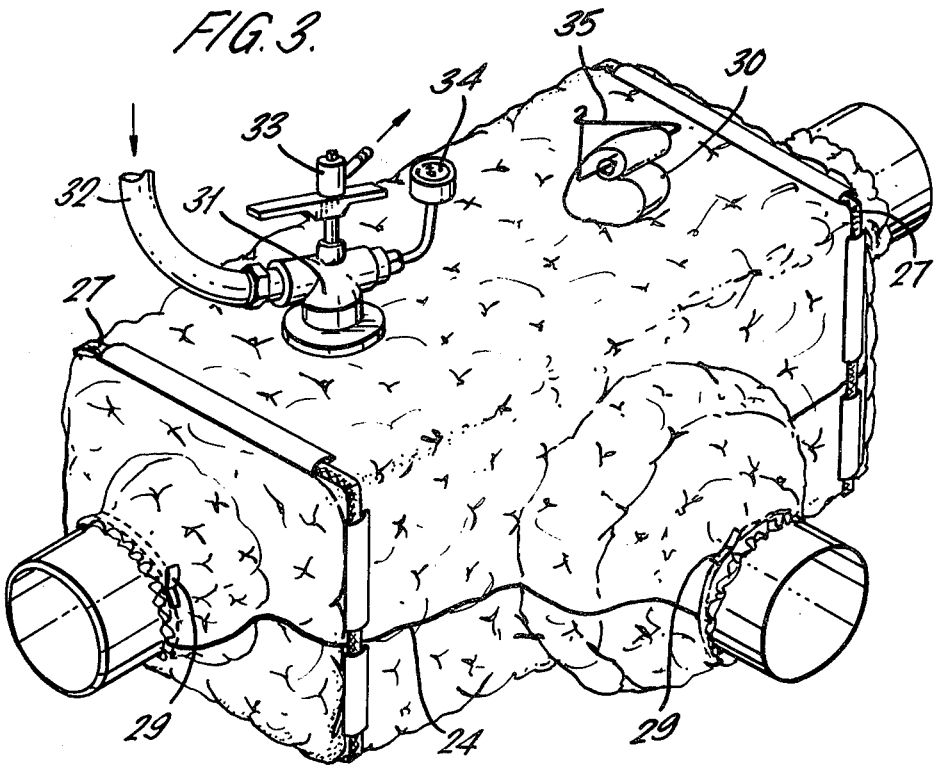
FIG. 3 is a perspective view showing the wrapping of FIG. 2 in position on the joint of FIG. 1, during the stage at which sealant material is introduced around the joint.

FIG. 1 shows a Tee-joint 10 in a pipeline. From the joint 10 branch three pipe sections 11, 12 and 13.

In the event of the joint 10 leaking, a mould wrapping 14 is made and shaped to fit around the joint 10 and adapted to be secured to the pipe sections 11, 12 and 13. It will be appreciated that there are many different pipe joints and that the description of this embodiment is merely one example of many joints which could be repaired using the same method but with a wrapping of a different configuration.

The wrapping 14 shown in FIG. 2, partly cut away, has an inner skin 15 and an outer skin 16 and separation between the two skins 15 and 16 is limited by the fitting of tags 17 which in this embodiment are of the type commonly used to attach price tags to clothing. The tags 17 are shown in more detail in FIG. 4 and it can be seen that they have a body portion 18 which passes between the two skins 15 and 16 and retaining end portions 19 and 20 which prevent separation of the two skins 15 and 16. The skins 15 and 16 are conveniently of a woven material, such as woven nylon, which allows the smaller retaining portion 19 to be inserted through the two skins 15 and 16.

The wrapping 14 is adapted to fit the joint 10 and has tubular portions 21, 22 and 23 adapted to fit around pipe sections 11, 12 and 13. In order to fit the wrapping 14 around the joint 10, a pair of sliding clasp fasteners 24, 25 are included so that the wrapping can be opened out to fit around the joint 10.

In order to support the wrapping before any mould-forming compound is introduced, sleeves 26 are provided, the sleeves being engageable by support bars 27 as shown in FIG. 3. In order to secure the tubular portions 21, 22 and 23 around the pipe sections 11, 12 and 13 further sleeves 28 are provided for engagement by straps 29 as shown in FIG. 3.

To allow mould-forming material to be introduced into the space between the two skins 15 and 16, a filler tube 30 is provided. It will be appreciated that the joint illustrated in this embodiment is relatively small and that only one filler 30 is required. Where a large joint is to be repaired, it may be necessary to have more than one filler 30 arranged at different heights on the wrapping 14 to overcome the problem of quick setting of the mould forming material. The filler tube 30 is shown rolled down and sealed in FIG. 3.

In order to provide access for sealant material to the place between the joint and the inner skin 15, an injector 31 is provided. Sealant material is introduced under pressure via a tube 32 which feeds into the injector 31 and gases from the space between the joint 10 and the inner skin 15 may be vented through a vent 33. A pressure gauge 34 indicates the pressure in the space between the joint 10 and the inner skin 15.

The joint 10 is sealed in the following way.

The joint 10 is likely to be underground and must first be excavated to ensure at least eight inches clearance all round. When the joint is exposed, a joint must be grit blasted over the total area to be encapsulated to ensure that the joint is clean and that the sealant material will be able to adhere to it. Excess grit is blown off the joint.

When the joint 10 has been prepared, the wrapping 14 is arranged around the joint. Any support bars 27 which are too long to fit into the sleeves 26 once the wrapping has been fitted are fitted before the wrapping is arranged around the joint 10. The sliding clasp fasteners 24 and 25 are then pulled across and sealed with, for example, a mastic compound. It will be noted that separate sliding clasp fasteners are provided for the inner skin 15 and the outer skin 16 and the inner skin is first closed and sealed and then the outer skin is closed and sealed.

At this stage, any further support bars 27 are inserted into the sleeves 26 and the straps 29 are inserted into the sleeves 28. The straps 29 are tightened around the respective pipe sections to secure the wrapping 14 in place around the joint.

At this stage, it must be ensured that the vent 33 is open.

Mould-forming material, conveniently a fast setting resin compound, is introduced through the filler tube 30 into the space between the inner and outer skins 15 and 16. Filling is continued until the space between the skins is full of mould-forming compound. In a larger wrapping where more than one filler 30 is provided, the lowest filler is used first and closed when the level of the filler has been reached by the mould-forming material, then the next filler is used and the process continued until the highest level filler has been used and closed. The filler or fillers 30 are closed by using a wire loop arrangement which can be seen in FIG. 3 and numbered 35 which forces down material into the space between the two skins 15 and 16. It will be appreciated that the tags 17 limit separation of the skins 15 and 16 during the filling of the space between the skins with mould-forming compound.

Once the mould-forming material has cured, commonly a time of the order of thirty minutes, pressurization of the mould space between the joint 10 and the inner skin 15 can begin. If the sealant material to be introduced around the joint requires a dry surface, the inner skin 15 may be dried by means of a hot air blower. Pressurizing equipment (not shown) is attached to the mould and sealant material is introduced through the tube 32 into the mould space. The open vent 33 allows gas to escape from the mould space. Sealant is introduced until the mould space is filled. At this stage, the vent 33 is closed and pressure is applied to the sealant material, the pressure being measured by the gauge 34. The vent 33 is opened at intervals during pressurization to allow gas to escape.

When the pressure gauge reads a pressure of 10 PSI (700 mbar) above the pressure in the pipe, no further gas can escape. The vent 33 is then opened until only sealant escapes from it and then the vent 33 is closed. The pressure in the mould space is then increased back to 10 PSI above the pipe pressure. The pressurizing inlet is then sealed and the pressurizing equipment removed.

Figure 4:
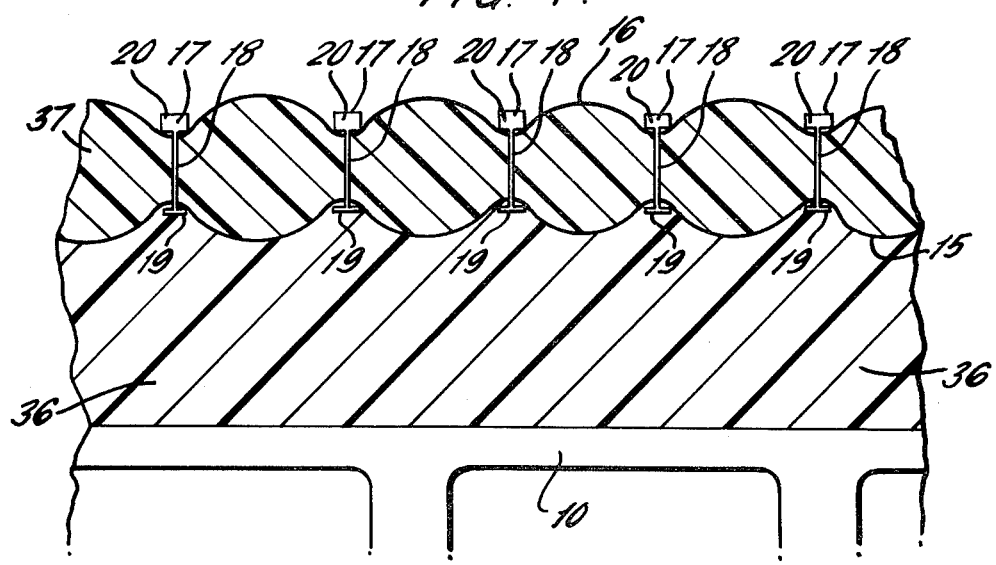
FIG. 4 is a sectional view of part of the repaired joint showing the layers of material surrounding the joint.

FIG. 4 illustrates the layers of material involved in sealing the joint 10. Sealant material 36 occupies the mould space between the joint 10 and the inner skin 15 and mould forming material 37 fills the space between the inner skin 15 and the outer skin 16.

We claim:

1. In a method of repairing a leak in a pipe or pipeline comprising the steps of providing a mould around the pipe or pipeline by installing and securing a flexible mould around the pipe and introducing a sealant into the space so provided between the mould and pipe or pipeline, there being vent means from the mould space to atmosphere, the improvement being that the flexible mould has an inner skin and an outer skin which can be separated only by a limited amount, a mould forming material is introduced into the space defined between the skins, the mould-forming material is allowed to set to a rigid form to provide a rigid mould around the pipe or pipeline into which the said sealant is injected.

2. A method as claimed in claim 1 comprising the step of pressurizing the sealant in the mould space.

3. A method as claimed in claim 2 wherein the vent means are opened periodically during pressurization of the sealant material.

4. A method as claimed in claim 1 comprising the step of fitting support means to the flexible wrapping for supporting the flexible wrapping while the mould-forming material is introduced.

5. A method as claimed in claim 1 comprising the step of filling the space between the skins through more than one filler, the fillers being arranged at different heights and the lowest filler being used first and closed before the next filler is used, the sequence being followed until the highest filler has been closed.

6. A method as claimed in claim 5 wherein each filler comprises a filler tube leading to the space between the skins, each filler tube being closed by rolling down the filler tube, when the space between the skins has been filled with filler above the level of the opening of the filler tube into the space between the skins.

7. Apparatus for use in repairing a leak in a pipe or pipeline comprising a flexible wrapping having an inner skin and an outer skin which can be separated only by a limited amount and vent means, mould-forming material for introduction into the space defined between the skins and sealant material for introduction into the mould space between the inner skin and the pipe or pipeline.

8. Apparatus as claimed in claim 7 wherein the means for limiting separation of the skins comprises a plurality of tag members, each tag member having an elongate body portion passing through the skins and retaining end portions, one lying on the side of the first skin remote from the second skin and the other lying on the side of the second skin remote from the first skin.

9. Apparatus as claimed in claim 7 comprising support means for supporting the flexible wrapping.

10. Apparatus as claimed in claim 7 wherein the first skin has a sliding clasp fastener to allow the skin to be secured around a pipe or pipeline.

11. Apparatus as claimed in claim 7 wherein the second skin has a sliding clasp fastener to allow the skin to be secured around a pipe or pipeline.

12. Apparatus as claimed in claim 7 comprising a plurality of filler tubes at different heights for allowing mould forming material to be introduced into the space between the two skins.

* * * * *